United States Patent
Sethi et al.

(10) Patent No.: US 11,689,918 B2
(45) Date of Patent: Jun. 27, 2023

(54) REMOTE ACCESS POINT CLUSTERING FOR USER AUTHENTICATION IN WIRELESS NETWORKS

(71) Applicant: HEWLETT PACKARD ENTERPRISE DEVELOPMENT LP, Houston, TX (US)

(72) Inventors: Aseem Sethi, Bangalore (IN); Manoj Wagle, Bangalore (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 569 days.

(21) Appl. No.: 16/290,451

(22) Filed: Mar. 1, 2019

(65) Prior Publication Data

US 2020/0280851 A1    Sep. 3, 2020

(51) Int. Cl.
| | |
|---|---|
| H04W 12/06 | (2021.01) |
| H04L 9/32 | (2006.01) |
| H04L 9/08 | (2006.01) |
| H04L 9/06 | (2006.01) |
| H04W 12/041 | (2021.01) |
| H04W 88/08 | (2009.01) |

(Continued)

(52) U.S. Cl.
CPC .......... *H04W 12/06* (2013.01); *H04L 9/0637* (2013.01); *H04L 9/085* (2013.01); *H04L 9/3268* (2013.01); *H04W 12/041* (2021.01); *H04L 9/50* (2022.05); *H04W 84/12* (2013.01); *H04W 88/08* (2013.01)

(58) Field of Classification Search
None
See application file for complete search history.

(56) References Cited

U.S. PATENT DOCUMENTS

| 2004/0064690 A1* | 4/2004 | Yu ................... H04L 9/3247 713/156 |
| 2005/0198306 A1* | 9/2005 | Palojarvi ............ H04L 63/0272 709/227 |

(Continued)

FOREIGN PATENT DOCUMENTS

| WO | WO-2017220115 A1 | 12/2017 |
| WO | WO-2018046105 A1 | 3/2018 |

OTHER PUBLICATIONS

Blockchain Investment in the Telco Industry, May 9, 2017, pp. 1-17, Retrieved from the Internet on Dec. 16, 2018 from URL: <ashurst.com/en/news-and-insights/legal-updates/blockchain-in-telecoms-industry/>.

*Primary Examiner* — Bassam A Noaman
(74) *Attorney, Agent, or Firm* — McDermott Will & Emery (57) ABSTRACT

A method is provided that includes receiving, at a first access point in a local area network, a request from a client device to access a wireless local area network. The method also includes creating authentication credentials for the client device based on an identification of the client device, and transmitting the authentication credentials for the client device to a second access point, wherein the first access point and the second access point share a secure block chain application. The method also includes allowing the client device to roam from the first access point to the second access point without requesting new authentication credentials. A system and a non-transitory, computer-readable medium storing instructions to perform the above method are also provided.

15 Claims, 5 Drawing Sheets

(51) Int. Cl.
*H04W 84/12* (2009.01)
*H04L 9/00* (2022.01)

(56) References Cited

U.S. PATENT DOCUMENTS

| | | | |
|---|---|---|---|
| 2008/0005562 A1* | 1/2008 | Sather | H04L 9/3236 |
| | | | 713/168 |
| 2018/0063714 A1* | 3/2018 | Stephenson | H04W 12/35 |
| 2018/0101684 A1 | 4/2018 | Murphy et al. | |
| 2018/0167221 A1* | 6/2018 | Kalan | H04L 9/30 |
| 2018/0295546 A1 | 10/2018 | Crawford | |
| 2018/0309570 A1 | 10/2018 | Amini et al. | |
| 2019/0223089 A1* | 7/2019 | Salgueiro | H04W 48/20 |
| 2019/0394648 A1* | 12/2019 | Tipton | H04W 12/50 |
| 2020/0118124 A1* | 4/2020 | Menon | G06Q 20/409 |
| 2020/0213305 A1* | 7/2020 | Obaidi | H04L 63/0876 |
| 2020/0228349 A1* | 7/2020 | Basu | H04L 9/3255 |
| 2020/0244441 A1* | 7/2020 | Madineni | H04L 9/3239 |

* cited by examiner

REMOTE ACCESS POINT CLUSTERING FOR USER AUTHENTICATION IN WIRELESS NETWORKS

BACKGROUND

A critical task in centralized network engineering is to handle user access at remote locations without incurring in undue latencies, or dropping users as they roam through a local area network. Solutions in the open domain are typically focused on conventional authentication systems that replace a user identifier (ID) and/or password with a secure token. However, these approaches involve infrastructure overhead, thereby incurring in significant increase to installation, maintenance costs, and still requiring access to a remote server.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

In a wireless network, roaming and connectivity of client devices is a typical source of frustration for the user and for the network administrators. The user demands smooth and seamless connectivity of client devices, while network administrators are concerned about secure links and network overload. The problem is exacerbated in wide area networks (WANs), such as software-defined WANs (SDWANs), wherein a core server may be remotely positioned relative to local area networks (LANs) serviced by the WAN. Secure authentication protocols handled by the core server may incur in long latencies, causing network congestion and connectivity loss. Embodiments as disclosed herein solve the above problem arising in computer network technology by clustering remote access points (APs) in a LAN, within a block chain network to perform client device authentication and prevent or quickly recover from disconnects.

Embodiments as disclosed herein provide a technical solution to the above problem by clustering remote APs for fast-authentication in a remote network site, or LAN. The clustered APs use a permissible block chain authentication protocol to allow roaming and long lived authentication credentials of client devices at remote sites. Once the user at the remote LAN has been authenticated and shared keys have been sent or generated to the remote AP (e.g., from the core server), the AP places an entry for the client device in a secure block chain transaction database that is accessible to each of the APs in the LAN. In some embodiments, the database is locally accessible (e.g., is part of the LAN). Thus, connectivity between the client device and a new AP in the LAN may be maintained through the secure block chain transaction, avoiding the need to re-authenticate the client device with the core server.

In one embodiment of the present disclosure, a computer-implemented method is described that includes receiving, at a first access point in a local area network, a request from a client device to access a wireless local area network. The computer-implemented method also includes creating authentication credentials for the client device based on an identification of the client device, and transmitting the authentication credentials for the client device to a second access point, wherein the first access point and the second access point share a secure block chain application. The computer-implemented method also includes allowing the client device to roam from the first access point to the second access point without requesting new authentication credentials.

According to one embodiment, a system is described that includes a memory storing instructions and one or more processors configured to execute the instructions to receive, at a first access point in a local area network, a request from a client device to access a wireless local area network, and to create authentication credentials for the client device based on an identification of the client device. The one or more processors are also configured to execute instructions to transmit the authentication credentials for the client device to a second access point, wherein the first access point and the second access point share a secure block chain application and to allow the client device to roam from the first access point to the second access point without requesting new authentication credentials.

According to one embodiment, a non-transitory, machine-readable medium is described that includes instructions, which when executed by one or more processors, cause a computer to perform a method, the method including receiving, at a first access point in a local area network, a request from a client device to access a wireless local area network. The method also includes creating authentication credentials for the client device based on an identification of the client device, transmitting the authentication credentials for the client device to a second access point, wherein the first access point and the second access point share a secure block chain application, and allowing the client device to roam from the first access point to the second access point without requesting new authentication credentials.

In yet other embodiment, a system is described that includes a means for storing commands and a means for executing the commands causing the system to perform a method that includes receiving, at a first access point in a local area network, a request from a client device to access a wireless local area network. The method also includes creating authentication credentials for the client device based on an identification of the client device, transmitting the authentication credentials for the client device to a second access point, wherein the first access point and the second access point share a secure block chain application, and allowing the client device to roam from the first access point to the second access point without requesting new authentication credentials.

In one embodiment, a computer-implemented method as disclosed herein includes retrieving from a server, in an access point communicatively coupled with the server, an address for a contract between a network controller in a local area network and a block chain network. The computer-implemented method also includes activating, in the access point, a register function based on the address for the contract, storing, in a database communicatively coupled with the access point, access point information and credentials in the public contract with the register function, and installing in the access point a function configured to register a user of the local area network. The computer-implemented method also includes installing, in the access point, a function configured to retrieve an authorization data from the user of the local area network and to store the authorization data in a structure where it can be retrieved by a second access point in the local area network.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Example System Architecture

Figure 1:
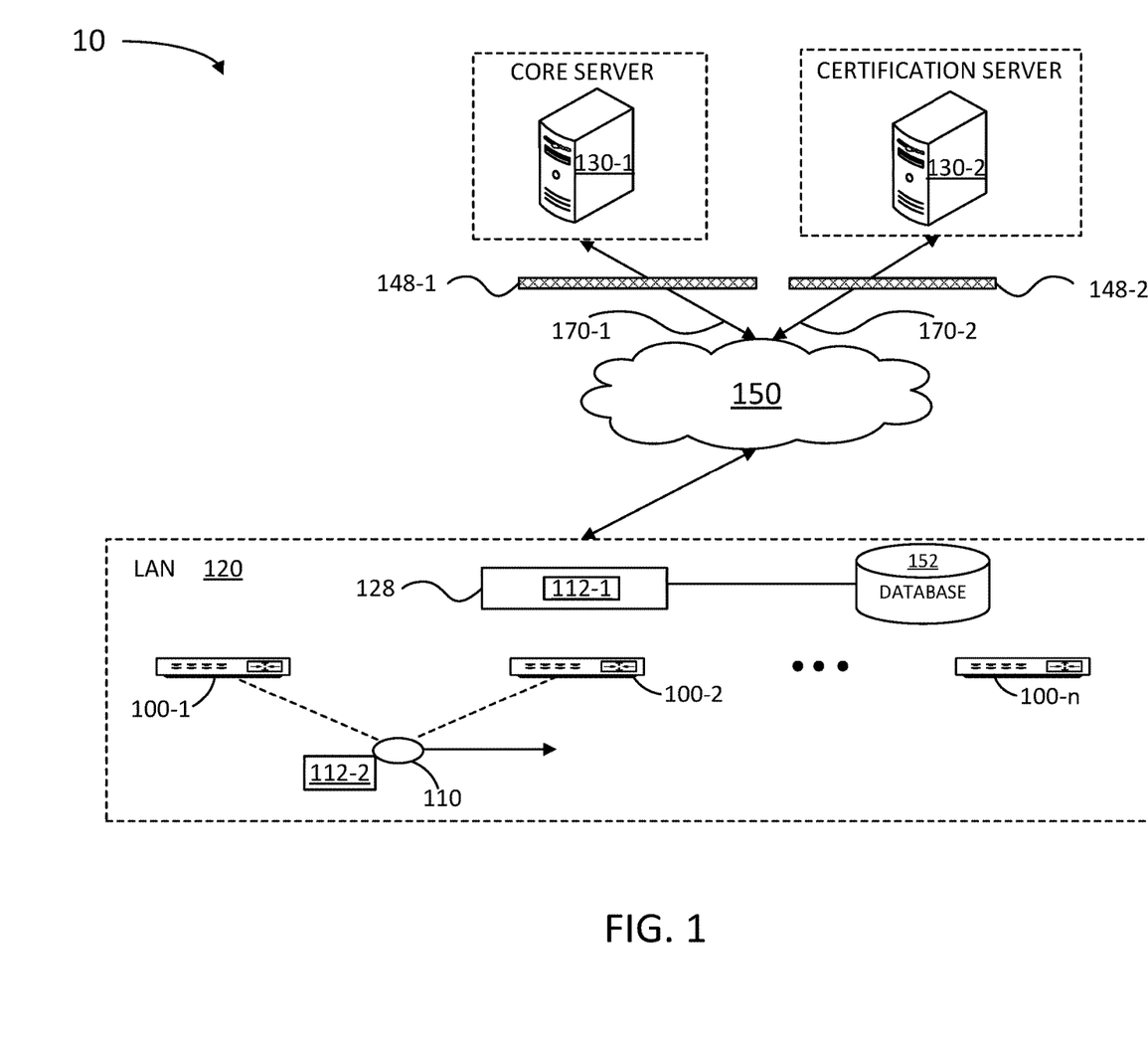
FIG. 1 is an architecture illustrating a wireless network configured for remote access point clustering, according to certain aspects of the disclosure.

FIG. 1 illustrates an architecture illustrating a wireless network 10 configured for remote access point clustering, according to certain aspects of the disclosure. In some embodiments, network architecture 10 includes a core server 130-1 and a certification server 130-2 (collectively referred to, hereinafter, as "servers 130") communicatively coupled, through a network 150, with a local area network (LAN) 120 provided by an enterprise or corporation. Core server 130-1 communicates with LAN 120 through network 150 via an encrypted link 170-1 in a firewall 148-1. Certification server 130-2 may be configured to operate and service a block chain network through network 150, via an encrypted link 170-2 through a firewall 148-2. Firewalls 148-1 and 148-2 will be collectively referred to, hereinafter, as "firewalls 148." In some embodiments, core server 130-1 may be a corporate server at the headquarters of an enterprise hosting LAN 120 (e.g., a service provider, a business, an industry, or a chain franchise such as a restaurant, hotel, and the like). LAN 120 includes multiple access points (APs) 100-1, 100-2, through 100-n (hereinafter, collectively referred to as "APs 100"), coordinated by a controller 128. In some embodiments, network architecture 10 may span a wide range of geo-locations, including multiple continents (e.g., core server 130-1 may be located in a different continent than LAN 120).

A client device 110 may request access to wireless network 10 through one of APs 100 (e.g., AP 100-1). In embodiments consistent with the present disclosure, client device 110 may include a mobile device, a smart-phone, a laptop, a palm device (e.g., a "pad"), or any other type of mobile computer device having a network connectivity through a wireless communication channel (e.g., radio-frequency, cellular, Wi-Fi, BlueTooth, and the like). In some embodiments, AP 100-1 may have access to, and create a contract with, a block chain network, to register client device 110 in a secure authentication protocol. The contract can be accessed by any one of APs 100-2 through 100-n. Thus, any new AP 100 accessing the contract may register to the block chain network, and also register new client devices that attempt a first connection to LAN 120 at run time. In some embodiments, each new client device may be registered as an independent transaction in the cluster block chain. AP 100-1 may set up an authentication protocol through the block chain network hosted by certification server 130-2, after validating the credentials of client device 110. AP 100-1 is registered to the block chain network by validating a contract, upon request from AP 100-1. When client device 110 is authenticated, a public key 112-1 and a private key 112-2 (hereinafter, collectively referred to as "encrypted keys 112") are sent to, or generated by AP 100-1, from certification server 130-2. In some embodiments, private key 112-2 is provided to client device 110, and public key 112-1 is provided to controller 128 to be accessible by other APs 100. AP 100-1 places an entry for the transaction registering client device 110 in a log in a block chain engine that is running in each of APs 100.

The authentication protocol may include creating a public key 112-1 and a private key 112-2 through an encryption tool hosted by core server 130-1. Public key 112-1 may be stored in controller 128, and private key 112-2 may be provided to client device 110. According to embodiments disclosed herein, public key 112-1 may be configured to be visible not only by the first AP accessed by client device 110 (e.g., AP 100), but also by other APs 100 in the cluster (e.g., AP 100-2). Thus, when client device 110 roams away from AP 100-1 and requests continued access to LAN 120, AP 100-2 may locally access public key 112-1 in controller 128 to verify private key 112-2. This avoids having to re-validate the authentication credentials of mobile device 110 all the way back up to core server 130-1. Accordingly, the latency in wireless network 10 is substantially reduced, providing a seamless and continuous network service to the user of client device 110.

The transaction registered by AP 100-1 authenticates client device 110 via an authentication, authorization and accounting (AAA) engine in core server 130-1. The transaction includes information associated with a user profile and encrypted keys 112. In some embodiments, the transaction information may be distributed to APs 100 that are part of the authentication cluster via controller 128. In some embodiments, the APs 100 that are not part of the authentication cluster may request registration by accessing the contract in certification server 130-2.

When client device 110 roams and authenticates with a second AP (e.g., AP 100-2), encrypted keys 112 can be checked by any AP node registered in the block chain cluster. Thus, the clustered AP 100 may verify the identity of client device 110 as it roams from a peer AP 100 (registered in the cluster). Even when link 170-1 is down, some embodiments maintain a smooth connectivity of client device 110 throughout remote LAN 120. In fact, in some embodiments, a first remote access through network 150 may be the first interaction of AP 100-1 when registering client device 110 to the cluster for the first time. Thereafter, any further transaction with client device 110 may be completed locally within remote LAN 120.

In some embodiments, encrypted keys 112 may be generated either by certification server 130-2 or by AP 100-1 at the time of registering client device 110 (through a block chain engine installed in AP 100-1). In some embodiments, at least one of encrypted keys 112 (e.g., public key 112-1) may be accessible, or published to all APs 100 that are registered in the authentication cluster. In some embodiments, client device 110 may access LAN 120 with a user ID and password authenticated by the AAA engine in core server 130-1 at the first access of LAN 120 by client device 110 (e.g., through AP 100). After a first contact through AP 100-1, client device 110 sends private key 112-2 (or a self-signed certificate) over a secure channel to a second AP 100-2, which is also part of the authentication cluster and has access to public key 112-1. Private key 112-2 is thus only in the hands of client device 110. Accordingly, private key 112-2 can be regenerated by client device 110 at any time. In some embodiments, a time to live TTL may be added to private key 112-2 ranging from a few minutes to hours, for additional security. The TTL value may be set by client device 110, by AP 100, or controller 128, or by certification server 130-2. The block chain engine in APs 100 maintains security of the transaction associated to client device 110. Further, the block chain engine associates the next transaction involving client device 110 that is entered by any one of APs 100 in the cluster to encrypted keys 112. In some embodiments, the transaction includes profile data for client device 110 and encrypted keys 112 and is stored in a database 152.

Core server 130-1 and client devices 110 include memory circuits storing instructions which, when executed by one or more processors, cause the devices to perform at least some of the steps in methods as disclosed herein. Network 150 can include, for example, any one or more of a wide area network (WAN), the Internet, and the like. Further, network 150 and LAN 120 can include, but are not limited to, any one or more of the following network topologies, including a bus network, a star network, a ring network, a mesh network, a star-bus network, tree or hierarchical network, and the like.

Figure 2:
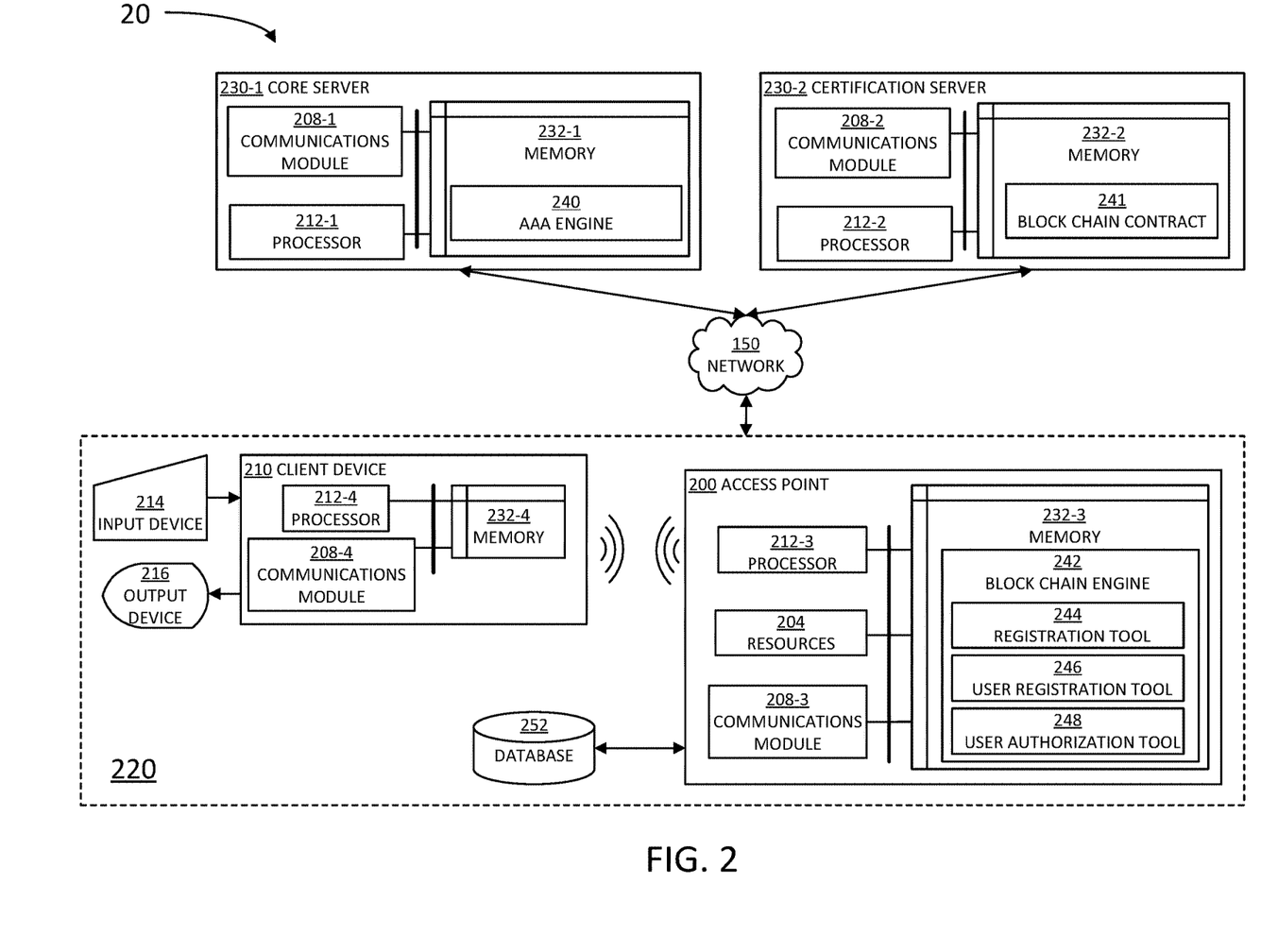
FIG. 2 illustrates a detailed description of some devices in the architecture of FIG. 1, according to some embodiments.

FIG. 2 illustrates a detailed description of some devices in the architecture of FIG. 1, according to some embodiments. A wireless network 20 includes a core server 230-1 that is coupled through network 150 with an access point 200 in a LAN 220. A client device 210 may initiate a request to access LAN 220 through AP 200. Core server 230-1 includes a communications module 208-1, a processor 212-1, and a memory 232-1. Memory 232-1 may include an AAA engine 240. AAA engine 240 may be configured to authorize and authenticate a first access of client device 210 to LAN 220 (through AP 200).

Certification server 230-2 includes a communications module 208-2, a processor 212-2, and a memory 232-2. Memory 232-2 may include a block chain contract 241 containing scripts and functions (e.g., register functions) that may be configured and downloaded to AP 200, upon request. In some embodiments, block chain contract 241 may be a result of an interaction or agreement between certification server 230-2 and core server 230-1. Block chain contract may include utility functions like "get User Data" (e.g., encrypted keys 112), or "de-Register User" (e.g., removing encrypted keys 112 from a client device profile).

AP 200 includes a communications module 208-3, a processor 212-3, resources 204, and a memory 232-3. Memory 232-3 may include a block chain engine 242. Block chain engine 242 may include a registration tool 244, a user registration tool 246, and a user authorization tool 248. Registration tool 244 enables a small memory footprint compatible with supported functions, and allows unnecessary functions to be omitted from the compiled binary in memory 232-3. The tools in block chain engine 242 may be provided, or configured, by block chain contract 241 upon request by AP 200. For example, AP 200 may request to access certification server 230-2 and register in block chain contract 241 after a first connectivity attempt by client device 210. AP 200 may also be coupled to a database 252 where authentication credentials for client device 210 may be stored. In some embodiments, database 252 may be part of a network controller associated with LAN 220. Accordingly, in some embodiments, database 252 may be accessible by one or more APs in LAN 220, so that the authentication credentials may be verified as client device 210 roams through LAN 220.

Client device 210 includes processor 212-4, communications module 208-4, and memory 232-4. Client device 210 may also be coupled with an input device 214 and an output device 216. Input device 214 may include a mouse, a keyboard, a touchscreen, and the like. Output device 216 may include a display, a touchscreen, a microphone, and the like. In some embodiments, input device 214 and output device 216 may be included in the same unit (e.g., a touchscreen).

Communications module 208-4 enables client device 210 to handle networking operations within AP 200, such as Wi-Fi, Bluetooth, and the like via resources 204. Resources 204 may include hardware and software components, such as radio-frequency (RF) antennas and controller circuits to scan LAN 220 and look for client devices 210 present therein (e.g., using a BLE radio), and the like. Communications modules 208-1, 208-2, 208-3, and 208-4 will be collectively referred to, hereinafter, as "communications modules 208." Communications modules 208 may include a wireless communication antenna so that client device 210 may locally interact with AP 200. Communications modules 208 are configured to interface with network 150 to send and receive information, such as data, requests, responses, and commands to other devices on wireless network 20. Communications modules 208 may include, for example, modems or Ethernet cards.

Figure 3:
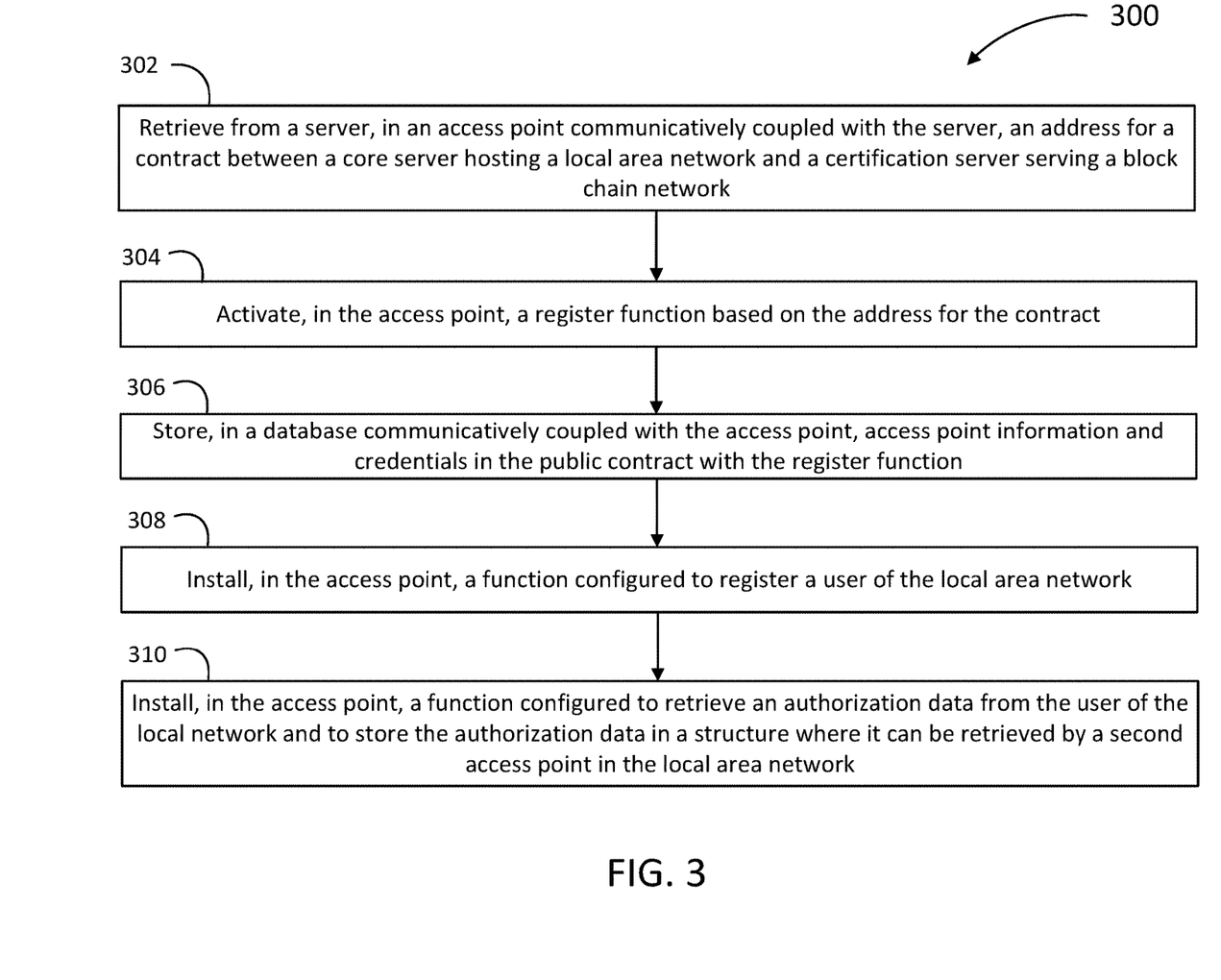
FIG. 3 is a flow chart illustrating steps in a method for configuring an access point within a secure cluster in a wireless network, according to some embodiments.

FIG. 3 is a flow chart illustrating steps in a method 300 for configuring an access point within a secure cluster in a wireless network, according to some embodiments. Method 300 may be performed at least partially by any one of a server or an access point while communicating with a client device in a LAN, through a network (e.g., any one of servers 130 or 230, access points 100 or 200, controller 128, client devices 110 or 210, LANs 120 and 220, and network 150). One of the servers may be a core server including an AAA engine to authorize access of the client device to the LAN for at least a first time (e.g., AAA engine 240 in core server 230-1). One of the servers may be a certification server hosting a block chain contract configured to communicate with, configure, and control a block chain engine in the AP (e.g., certification server 230-2, block chain contract 241, and block chain engine 242). The block chain engine may include a registration tool, a user registration tool, and a user authorization tool in the AP of the LAN (e.g., block chain engine 242, registration tool 244, user registration tool 246, and user authorization tool 248). The block chain contract engine includes a contract having scripts and functions that the AP in the LAN may use in the registration tool, the user registration tool, and the user authorization tool. In some embodiments, the LAN may include a network controller and a database configured to store client device profiles and other authentication credentials and encryption keys for accessing the LAN (e.g., controller 128, databases 152 and 252, and encryption keys 112). At least some of the steps in method 300 may be performed by a computer having a processor executing commands stored in a memory of the computer (e.g., processors 212 and memories 232). Methods consistent with the present disclosure may include at least some, but not all, of the steps illustrated in method 300, performed in a different sequence. Furthermore, methods consistent with the present disclosure may include at least two or more steps as in method 300 performed overlapping in time, or almost simultaneously.

Step 302 includes retrieving from the server, in the access point communicatively coupled with the server, an address for the contract between the core server hosting the LAN and the certification server hosting the block chain network. In some embodiments, step 302 includes creating the contract via a network controller, an AP in the LAN when the LAN is installed, or deployed in a remote location. In some embodiments, step 302 includes calling a method to register to the block chain network by accessing the address of the contract from a central location, a web site, and the like (e.g., the IP address of the certification server). In some embodiments, step 302 may include calling or downloading the register AP function from the block chain contract. In some embodiments, step 302 may include creating an independent transaction in the block chain network that includes a contract registration of the AP. In some embodiments, step 302 may include retrieving the address of the block chain contract, and storing the address in an accessible place (e.g., the database), so that multiple APs in the LAN can have access to the block chain contract. In some embodiments, and without any limitations in terms of the coding language, step 302 may be performed by executing the following code lines to create an authentication contract:

```
"pragma solidity ^0.4.0;
contract authRegister{
    address AP;
    address Client;
    Struct User AuthData {
    Credentials cred;
    Uint authTime;
    QosParams qosParams;
    PKI PublicKey;
    Etc...}"
```

Step 304 includes activating, in the access point, a register function based on the address for the contract. In some embodiments, step 304 includes activating the register function in the registration tool. In some embodiments, and without limitation, step 304 may be performed by executing the following script:

```
/* This function is executed at initialization and sets the owner of the contract */
Function register( ) { AP = msg.sender; }
function RegisterAP( ) { save AP info and credentials }
```

Step 306 includes storing, in the database communicatively coupled with the access point, access point information and credentials in the public contract with the register function.

Step 308 includes installing, in the access point, a function configured to register a user of the local area network. In some embodiments, step 308 includes activating or downloading the user registration tool from the server. In some embodiments, and without any limitations in terms of the coding language, step 308 may be performed by executing the following script:

```
function RegisterUser( ) {save the address of the User, and all the associated auth data in the Contract, Public Key generated by the User}
```

Step 310 includes installing, in the access point, a function configured to retrieve an authorization data from the user of the local network and to store the authorization data in a structure where it can be retrieved by a second access point in the local area network. In some embodiments, and without any limitations in terms of the coding language, step 310 may be performed by executing the following script:

```
function getUserAuthData( ) public view returns (get user auth data in a Struct and return to caller}.
```

In some embodiments, step 310 may include repeated calling of the Register User function from one or more of the APs in the LAN on the contract as the APs get client devices allocated through roaming, or by new client devices accessing the LAN. In some embodiments, step 310 may include determining parameters like quality of service (QoS), IP address, Public Key, and the like, in the call for the Register User function. In some embodiments, step 310 may include retrieving profiles and other parameters from client devices roaming to other APs in the LAN using the public key as input. In some embodiments, step 310 may include calling, from the AP, a function in the Contract to retrieve the client device profile.

Figure 4:
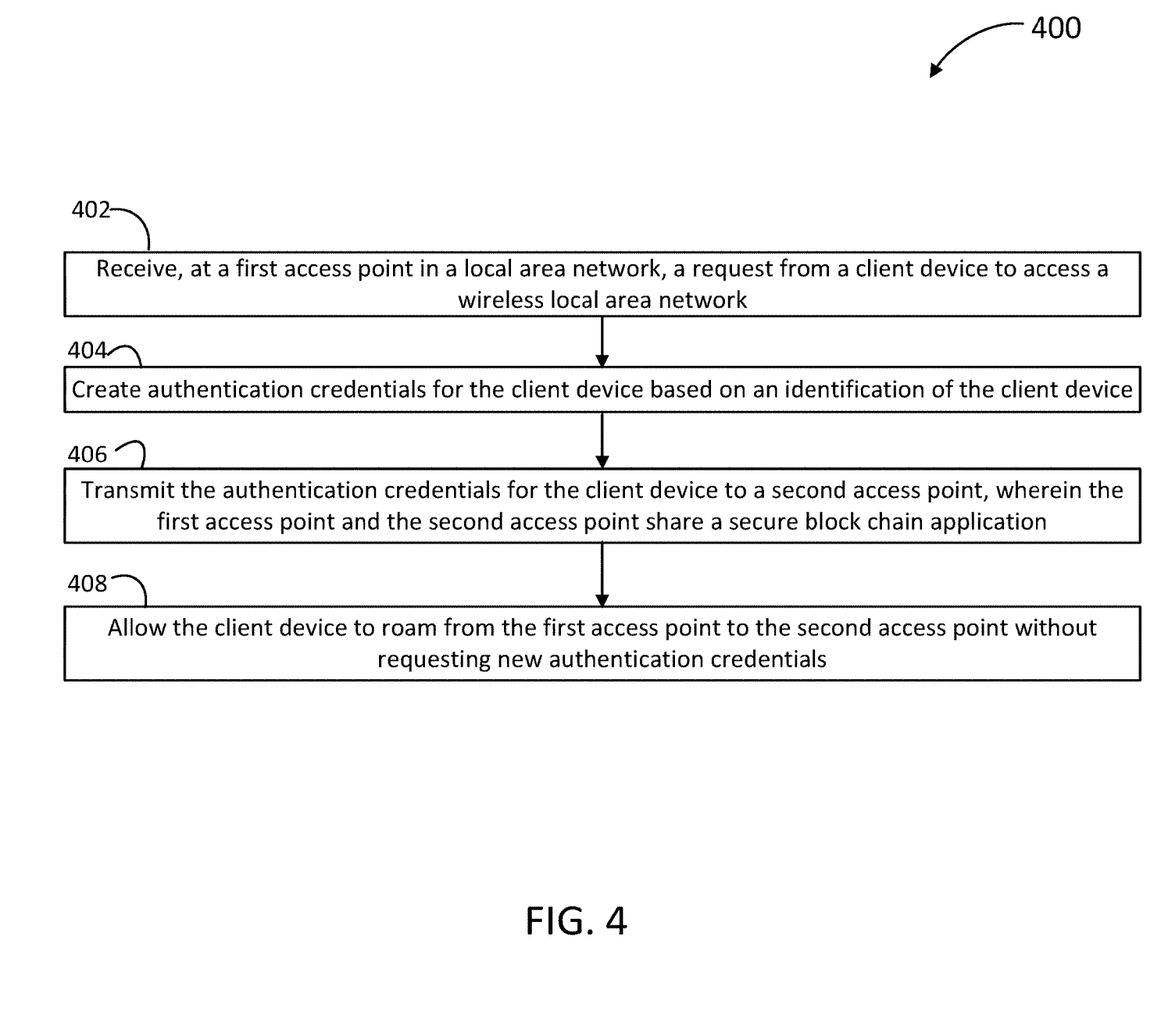
FIG. 4 is a flow chart illustrating steps in a method for accessing a wireless network with clustered access points, according to some embodiments.

FIG. 4 is a flow chart illustrating steps in a method 400 for accessing a wireless network with clustered access points, according to some embodiments. Method 400 may be performed at least partially by any one of a server or an access point while communicating with a client device in a LAN, through a network (e.g., any one of servers 130 or 230, access points 100 or 200, controller 128, client devices 110 or 210, LANs 120 and 220, and network 150). One of the servers may be a core server including an AAA engine to authorize access of the client device to the LAN for at least a first time (e.g., AAA engine 240 in core server 230-1). One of the servers may be a certification server hosting a block chain contract configured to communicate with, configure, and control a block chain engine in the AP (e.g., certification server 230-2, block chain contract 241, and block chain engine 242). The block chain engine may include a registration tool, a user registration tool, and a user authorization tool in the AP of the LAN (e.g., block chain engine 242, registration tool 244, user registration tool 246, and user authorization tool 248). The block chain contract engine includes a contract having scripts and functions that the AP in the LAN may use in the registration tool, the user registration tool, and the user authorization tool. In some embodiments, the LAN may include a network controller and a database configured to store client device profiles and other authentication credentials and encryption keys for accessing the LAN (e.g., controller 128, databases 152 and 252, and encryption keys 112). At least some of the steps in method 400 may be performed by a computer having a processor executing commands stored in a memory of the computer (e.g., processors 212 and memories 232). Methods consistent with the present disclosure may include at least some, but not all, of the steps illustrated in method 400, performed in a different sequence. Furthermore, methods consistent with the present disclosure may include at least two or more steps as in method 400 performed overlapping in time, or almost simultaneously.

Step 402 includes receiving, at a first access point in a local area network, a request from a client device to access a wireless local area network. In some embodiments, step 402 includes receiving a user ID and a password from the client device at a first access by the client device, and receiving a self-signed certificate from a public key in the client device at a second, subsequent access by the client device. In some embodiments, step 402 include authenticating the client device in the AP, with a user ID and a password, through the AAA engine in the core server. In some embodiments, step 402 may include entering one of the encrypted keys for the block chain network when the client device has already been authenticated a first time in the LAN.

Step 404 includes creating authentication credentials for the client device based on an identification of the client device. In some embodiments, step 404 includes generating a set of shared keys. In some embodiments, step 404 includes forming a distributed ledger accessible by multiple access points including the first access point and the second access point, and storing the authentication credentials in the distributed ledger. In some embodiments, and without limitation of the coding language, step 404 includes performing a script defined by the following code lines:

```
var authRegister = eth.contract(ABI).at(Address);
authRegister.RegisterAP(PKI publicKey, Other AP Data) - to register the AP
authRegister.RegisterUser(authData, PKI etc) - to register each User as he is authenticated by the AP. Each of these calls is a transaction in the Ethereum Network.
```

Step 406 includes transmitting the authentication credentials for the client device to a second access point, wherein the first access point and the second access point share a secure block chain application. In some embodiments, step 406 includes transmitting the authentication credentials to multiple access points running the secure block chain application in the wireless local area network.

Step 408 includes allowing the client device to roam from the first access point to the second access point without requesting new authentication credentials. In some embodiments, step 408 includes adding a time to live to a self-signed certificate from a public key in the client device, wherein the time to live is configured to last for a selected period of time ranging from a few minutes to several hours. In some embodiments, step 408 includes validating the authentication credentials by the secure block chain application in at least the first access point and in the second access point. In some embodiments, step 408 includes a transaction with the client device by the secure block chain application in at least the first access point and in the second access point, and creating a non-invertible cryptographic record of the transaction. In some embodiments, the first access point and the second access point reside in a remote branch network, and step 408 includes validating the authentication credentials for the client device in the second access point. In some embodiments, the first access point and the second access point reside in a remote branch network, and step 408 includes downloading to the client device, from one of the first access point or the second access point, a network policy associated with the authentication credentials.

Hardware Overview

Figure 5:
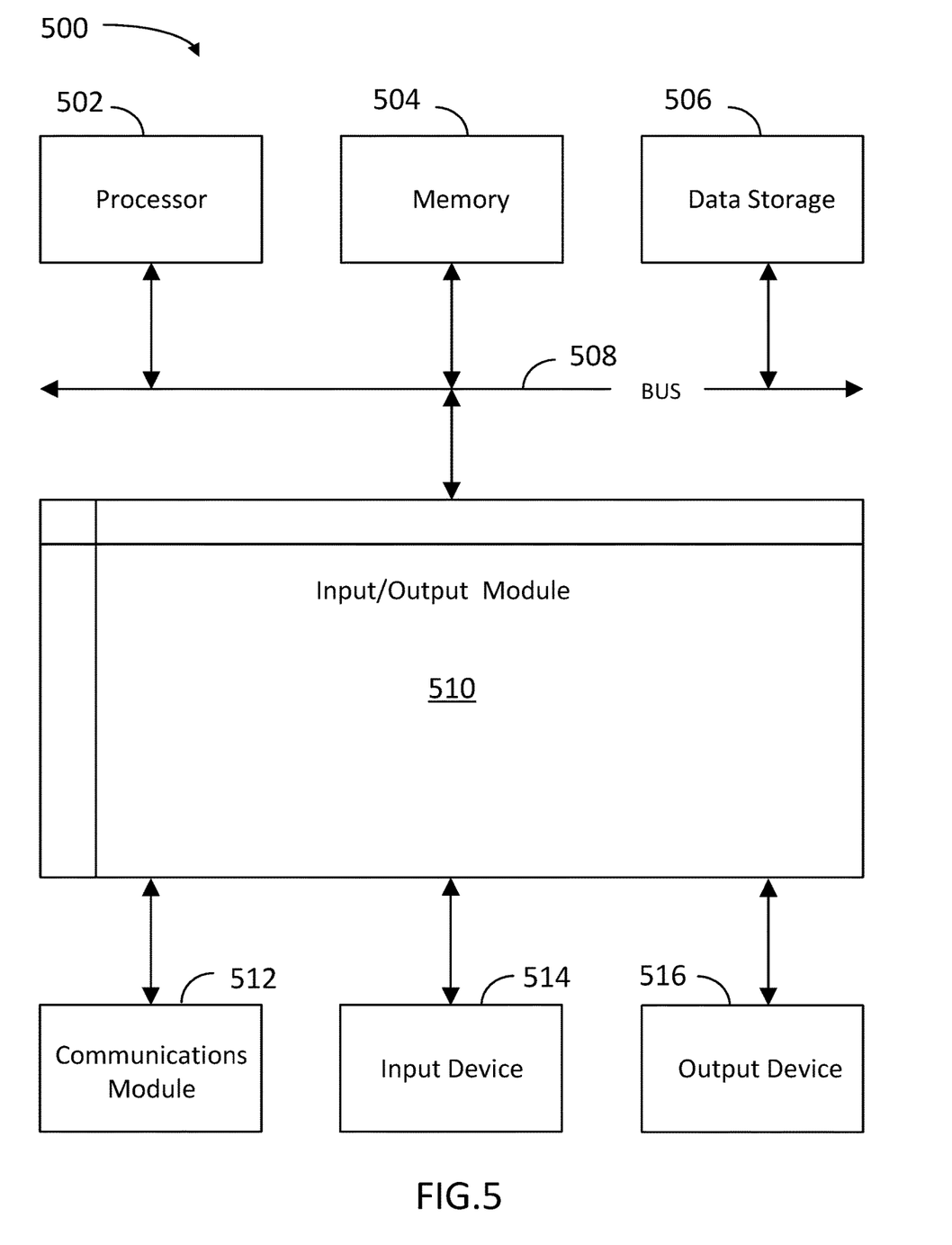
FIG. 5 is a block diagram illustrating an example computer system with which the wireless networks of FIGS. 1-2 and the methods of FIGS. 3-4 can be implemented.

FIG. 5 is a block diagram illustrating an exemplary computer system 500 with which the client devices 110 and 210, APs 100 and 200, and servers 130 and 230 of FIGS. 1-2, and the methods of FIGS. 3-4, can be implemented. In certain aspects, the computer system 500 may be implemented using hardware or a combination of software and hardware, either in a dedicated network device, or integrated into another entity, or distributed across multiple entities.

Computer system 500 (e.g., client devices 110 and 210, APs 100 and 200, and servers 130 and 230) includes a bus 508 or other communication mechanism for communicating information, and a processor 502 (e.g., processors 212) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memories 232), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

A computer program as discussed herein does not necessarily correspond to a file in a file system. A program can be stored in a portion of a file that holds other programs or data (e.g., one or more scripts stored in a markup document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage 506 such as a magnetic disk or optical disk, coupled to bus 508 for storing information and instructions. Computer system 500 may be coupled via input/output module 510 to various devices. Input/output module 510 can be any input/output module. Exemplary input/output modules 510 include data ports such as USB ports. The input/output module 510 is configured to connect to a communications module 512. Exemplary communications modules 512 (e.g., communications modules 208) include networking interface cards, such as Ethernet cards and modems. In certain aspects, input/output module 510 is configured to connect to a plurality of devices, such as an input device 514 (e.g., input device 214) and/or an output device 516 (e.g., output device 216). Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as an LCD (liquid crystal display) monitor, for displaying information to the user.

According to one aspect of the present disclosure, client devices 110 and 210, LANs 120 and 220, APs 100 and 200, and servers 130 and 230 can be implemented using a computer system 500 in response to processor 502 executing one or more sequences of one or more instructions contained in memory 504. Such instructions may be read into memory 504 from another machine-readable medium, such as data storage 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data network device, or that includes a middleware component, e.g., an application network device, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a branch office, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and network devices. A client and network device are generally remote from each other and typically interact through a communication network. The relationship of client and network device arises by virtue of computer programs running on the respective computers and having a client-network device relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage 506. Volatile media include dynamic memory, such as memory 504. Transmission media include coaxial cables, copper wire, and fiber optics, including the wires forming bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 212, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
    retrieving, by a first access point from a server hosting a Local Area Network (LAN), an address of a block chain contract;
    for a first access to the LAN by a client device, receiving, at the first access point in the LAN, a request from the client device to access a wireless LAN, wherein receiving the request from the client device comprises receiving a user ID and a password from the client device;
    responsive to the request from the client device, accessing the block chain contract based on the address to activate a function to register the client device by creating authentication credentials for the client device based on an identification of the client device and registering the client device as a transaction in the block chain, wherein the transaction comprises at least the authentication credentials and a public key of a public-private key pair associated with the client device,
    wherein the private key and the public key are sent from the server to the client device and a controller, respectively, wherein the controller is within the LAN and is coordinating between a plurality of access points within the LAN, wherein the public key is accessible by the plurality of access points and enables the plurality of access points to verify the private key stored in the client device and avoid re-validating the client device, using the server, when roaming through the plurality of access points;
    storing the address of the block chain contract in a database accessible, via the controller, by the plurality of access points to allow the access points to access the block chain contract; and
    allowing the client device to roam from the first access point to a second access point of the plurality of access points when a link between the first access point and the server is down without requesting new authentication credentials, wherein allowing the client device to roam from the first access point to the second access point comprises accessing, by the second access point, the transaction in order to validate the client device.

2. The computer-implemented method of claim 1, wherein registering the client device as the transaction comprises forming a distributed ledger accessible by the plurality of access points, and storing the authentication credentials in the distributed ledger.

3. The computer-implemented method of claim 1, further comprising transmitting the authentication credentials for the client device to the plurality of access points.

4. The computer-implemented method of claim 1, further comprising adding a time to live to a self-signed certificate from the public key of the public-private key pair associated with the client device, wherein the time to live is configured to last for a selected period of time ranging from a few minutes to several hours.

5. The computer-implemented method of claim 1, further comprising validating the authentication credentials by a block chain engine running in at least the first access point and in the second access point.

6. The computer-implemented method of claim 1, further comprising creating a non-invertible cryptographic record of the transaction.

7. The computer-implemented method of claim 1, wherein the first access point and the second access point reside in a remote branch network, and allowing the client device to roam comprises validating the authentication credentials for the client device in the second access point.

8. The computer-implemented method of claim 1, wherein the first access point and the second access point reside in a remote branch network, and the computer-implemented method further comprises downloading to the client device, from one of the first access point or the second access point, a network policy associated with the authentication credentials.

9. A system, comprising: a memory storing instructions; and one or more processors configured to execute the instructions to:
    retrieve, by a first access point from a server hosting a Local Area Network (LAN), an address of a block chain contract;
    for a first access to the LAN by a client device, receive, at the first access point in the LAN, a request from the client device to access a wireless LAN, wherein receiving the request from the client device comprises receiving a user ID and a password from the client device;
    responsive to the request from the client device, access the block chain contract based on the address to activate a function to register the client device by creating authentication credentials for the client device based on an identification of the client device and register the client device as a transaction in the block chain,
    wherein the transaction comprises at least the authentication credentials and a public key of a public-private key pair associated with the client device,
    wherein the private key and the public key are sent from the server to the client device and a controller, respectively, wherein the controller is within the LAN and is coordinating between a plurality of access points within the LAN, wherein the public key is accessible by the plurality of access points and enables the plurality of access points to verify the private key stored in the client device and avoid re-validating the client device, using the server, when roaming through the plurality of access points;

store the address of the block chain contract in a database accessible, via the controller, by the plurality of access points to allow the access points to access the block chain contract; and allow the client device to roam from the first access point to a second access point of the plurality of access points when a link between the first access point and the server is down without requesting new authentication credentials, wherein allowing the client device to roam from the first access point to the second access point comprises accessing, by the second access point from the client device, the transaction in order to validate the client device.

10. The system of claim 9, wherein the one or more processors further execute instructions to transmit the authentication credentials to the plurality of access points.

11. The system of claim 9, wherein the one or more processors further execute instructions to add a time to live to a self-signed certificate from the public key of the public-private key pair associated with the client device, and wherein the time to live is configured to last for a selected period of time ranging from a few minutes to several hours.

12. The system of claim 9, wherein to register the client device, the one or more processors further execute instructions to form a distributed ledger accessible by the plurality of access points, and to store the authentication credentials in the distributed ledger.

13. The system of claim 9, wherein the one or more processors further execute instructions to validate the authentication credentials by a block chain engine running in at least the first access point and in the second access 4 point.

14. A non-transitory, computer-readable medium storing instructions which, when executed by a processor, cause a computer to perform a method, the method comprising:

retrieving, by a first access point from a server hosting a Local Area Network (LAN), an address of a block chain contract;

for a first access to a LAN by a client device, receiving, at the first access point in the LAN, a request from the client device to access a wireless LAN, wherein receiving the request from the client device comprises receiving a user ID and a password from the client device;

responsive to the request from the client device, accessing the block chain contract based on the address to activate a function to register the client device by creating authentication credentials for the client device based on an identification of the client device and registering the client device as a transaction in the block chain, wherein the transaction comprises at least the authentication credentials and a public key of a public-private key pair associated with the client device, wherein the private key and the public key are sent from the server to the client device and a controller, respectively, wherein the controller is within the LAN and is coordinating between a plurality of access points within the LAN, wherein the public key is accessible by the plurality of access points and enables the plurality of access points to verify the private key stored in the client device and avoid re-validating the client device, using the server, when roaming through the plurality of access points;

storing the address of the block chain contract in a database accessible, via the controller, by the plurality of access points to allow the access points to access the block chain contract; and allowing the client device to roam from the first access point to a second access point of the plurality of access points when a link between the first access point and the server is down without requesting new authentication credentials, wherein allowing the client device to roam from the first access point to the second access point comprises accessing, by the second access point, the transaction in order to validate the client device.

15. The non-transitory, computer-readable medium of claim 14, wherein the method further comprises transmitting the authentication credentials to the plurality of access points.

* * * * *